United States Patent [19]

Stewart et al.

[11] Patent Number: 4,794,527
[45] Date of Patent: Dec. 27, 1988

[54] MICROPROGRAMMED DATA PROCESSING SYSTEM USING LATCH CIRCUITS TO ACCESS DIFFERENT CONTROL STORES WITH THE SAME INSTRUCTION AT DIFFERENT TIMES

[75] Inventors: Robert E. Stewart, Stow; Donald F. Hooper, Northboro, both of Mass.

[73] Assignee: Digital Equipment Corporation, Maynard, Mass.

[21] Appl. No.: 823,804

[22] Filed: Jan. 29, 1986

[51] Int. Cl.⁴ .......................... G06F 9/22; G06F 9/28; G06F 9/38
[52] U.S. Cl. .................................................... 364/200
[58] Field of Search ... 364/200 MS File, 900 MS File, 364/283, 318, 627, 628, 465, 466, 640

[56] References Cited

U.S. PATENT DOCUMENTS

| | | | |
|---|---|---|---|
| 3,886,523 | 5/1975 | Ferguson et al. | 340/172.5 |
| 3,953,833 | 4/1976 | Shapiro | 340/172.5 |
| 4,131,941 | 12/1978 | Siegel et al. | 364/200 |
| 4,370,709 | 1/1983 | Fosdick | 364/200 |
| 4,390,946 | 6/1983 | Lane | 364/200 |
| 4,574,344 | 3/1986 | Harris et al. | 364/200 |
| 4,574,394 | 3/1986 | Holsztynski et al. | 382/41 |
| 4,586,127 | 4/1986 | Horvath | 364/200 |
| 4,591,972 | 11/1982 | Guyer et al. | 364/200 |

OTHER PUBLICATIONS

Mick John et al., "Bit-Slice Microprocessor Design", McGraw-Hill Book Company, 1980, p. 143.

Primary Examiner—Archie E. Williams, Jr.
Assistant Examiner—Leo Li Wang
Attorney, Agent, or Firm—William W. Holloway; Maura K. Moran

[57] ABSTRACT

A microprogrammed data processing system uses a plurality of control stores to control the data processing system in response to a macroinstruction sequence. Between each control store is a latch element resulting in a given address being applied to each control store at different system clock cycles. The corresponding microinstruction segment from each control store is therefore provided at different clock cycles, making it possible to coordinate the microinstruction segment with the corresponding flow of data through the central processing unit. The use of a plurality of control stores can reduce the number of gate elements needed to delay microinstruction segments.

5 Claims, 5 Drawing Sheets

MICROPROGRAMMED DATA PROCESSING SYSTEM USING LATCH CIRCUITS TO ACCESS DIFFERENT CONTROL STORES WITH THE SAME INSTRUCTION AT DIFFERENT TIMES

BACKGROUND OF THE INVENTION

1. Field of the Invention

This invention relates generally to data processing systems and, more particularly, to central processing subsystems that are implemented using microprogramming techniques. By providing a plurality of control stores that are accessed by the same microinstruction at different time periods, simplifications in implementation of the central processing subsystem can be achieved.

2. Description of the Related Art

Referring to FIG. 1, a typical data processing system is shown. The data processing system includes at least one central processing unit or subsystem 10 (and 11), at least one input/output unit or subsystem 13 and 14), a main memory unit or subsystem 15 and a system bus 19 coupling the plurality of units or subsystems. The central processing unit(s) 10 (and 11) can manipulate groups of logic signals according to a sequence of instructions in a program or program stored in software and/or firmware. Typically the logic signal groups and the program itself are stored, at least during program execution, in the main memory unit 15. The input/output unit(s) 13 (and 14) can provide an interface between the data processing system and terminal units, mass storage units, communication units and other units requiring coupling to the data processing system. A console unit 12 can be coupled to the central processing unit(s) 10 (and 11) in order to initialize the data processing system, to control test and diagnostic procedures, and to be used as a termianl unit when the system is in operation. The system bus, 19 by providing a coupling between data processing system subsystems, provides a convenient technique for altering the configuration of the data processing system to accommodate a variety of processing requirements. The present invention relates to the execution of instructions by the central processing unit(s) 10 (and 11).

In a data processing system, such as is illustrated in FIG. 1, the actual manipulation of data signal groups takes place under the control of a group of related instructions that is generally called a program. These instructions are executed in a sequence. Referring next to FIG. 2a, the execution of a series of instructions according to the related art is illustrated. During a first time interval, $T_o$, the instruction #1 21 is executed by a central processing unit subsystem. After the first instruction 21, is executed, a next instruction #2 22 in the sequence is executed by the central processing unit subsystem during the second time interval $T_o$. Upon completion of instruction #2, 22 the data processing unit executes instruction #3 23 during a third time interval $T_o$. In order to maintain an orderly execution of instructions, the interval for the execution of any instruction by the data processing unit requires a predetermined period of time. If the execution time for an instruction can have a variable length, complex apparatus must then be included in the central processing unit to coordinate the exchange of data signal groups between the groups of logic components within the central processing unit and between the central processing unit and the other subsystems of the data processing system. Thus, the period for execution of the three instructions will generally be three times the basic time period $T_o$. It will be clear that the basic time interval must be of sufficient duration to permit the execution of the lengthiest instruction in the instruction set.

In order to provide for faster execution of instructions by the central processing unit, a technique for dividing the execution of an instruction, generally referred to as a macroinstruction, into the execution of at least one microinstruction has been devised. Each microinstruction is, in turn, divided into a group of microinstruction segments, each segment being executed sequentially by the central processing unit. By organizing the apparatus executing the microinstruction segments in an appropriate manner, the execution of the microinstructions can be performed in an overlapping manner. This technique is referred to as "pipelining" the execution of an instruction set. While the execution of each segmented microinstruction $2n'$ can (although not necessarily) take a longer period of time than is required for the execution of a nonsegmented microinstruction $2n$, because of the additional apparatus required for the division of the microinstruction into the microinstruction segments, an instruction stream can be executed faster than is possible for nonsegmented microinstruction $2_n$. In FIG. 2b, the division of an microinstruction $2n'$ into a plurality of segments $A_n$, $B_n$, $C_n$ and $D_n$ is shown. It will be understood that each segment relates to a separate and independently operating group of components in the central processing unit. Registers and gates, according to principals well-known in the art of data processing system design, separate the operation of component group executing a particular microinstruction segment. The subinterval, $t_o$, for each segment $A_n$, $B_n$, $C_n$ and $D_n$ must be of sufficient period of time to permit the execution of all possible segments in each apparatus group.

Referring next to FIG. 2c, the resulting increase in the rate of execution of a sequence of microinstrucitons possible, through the use of pipelining techniques, is illustrated. Instruction #1 21 is now completed in the new (and possibly longer) time period of $T'_o$ equals m times $t_o$, where $t_o$ is the subinterval required for the execution of each microinstruction segment $A_n$, $B_n$, $C_n$ and $D_n$ and where m is the number of microinstruction segments required for the execution of each microinstruction. The next microinstruction in the sequence, microinstruction #2 22, begins an interval $t_o$ after the beginning of microinstruction #1 21. The third microinstruction in the sequence, microinstruction #3 23, then begins an interval $t_o$ thereafter. Each microinstruction can take the increased amount of time for the execution. However, once the initial interval for the completion of the first microinstruction has passed, a microinstruction can be completed after each interval $t_o$. Thus, for a sequence of microinstructions, the execution of the sequence can be accelerated even through execution of the individual microinstruction can take an increased length of time.

Referring next to FIG. 3a, an organization for a central processing unit 10 implementing the pipelined execution of an microinstruction sequence is shown. The central processing unit 10 is divided into an instruction subunit 31 and associated control unit 32, an execution subunit 33 and a cache (or local) memory subunit 34. The cache memory subunit 34 is coupled to the system bus 19 and exchanges groups of logic signals with the other subsystems of the data processing system by means of the system bus 19 under control of the control unit 32. The execution subunit 33, again under control of the control unit 32, performs the manipulation of the data signal groups that is defined by the instructions being executed. The instruction subunit 31 receives the macroinstructions to be executed and reformats the instructions in a manner that can be used to control the operation of the central processing unit 10. The signals corresponding to the macroinstructions are applied to a random access memory or the logic apparatus in the control unit 32. The location of the random access memory in control unit 32, addressed by the macroinstruction signals, contains an address. This address is then applied to a control store within control unit 32, the control store being implemented by an addressable memory. The output signals from the control store are referred to as the microinstructions and are logic signals that are applied to the logic elements of the central processing processing system. The signals provided by the microinstructions control the operation of central procesing unit. The signals from the microinstructions are arranged in groups called micro-orders, and each micro-order can be used to control a portion of the central processing unit, for example, the execution of a microinstruction segment by the execution subunit 32.

Referring to the simplified division of the data processing unit shown in FIG. 3a and for purposes of illustrating the invention, the length of time for each unit of the central processing unit 10 to complete its portion of an execution of an instruction will be taken to be equal. Thus, for an instruction to be executed by the central processing unit 10, the execution of a set of instructions is illustrated in FIG. 2c. It will be understood that use of the term "cycles(s)" herein shall not be limited to mean one full clock cycle of the central processing unit 10. The time intervals in FIGS. 3b, 4a and 4b may represent either full or partial cycles of the central processing unit, depending on considerations of logic design that are well understood by those of ordinary skill in the art. Referring to both FIGS. 2c and 3b, the first instruction #1 21 will be processed by instruction subunit 31 during a first interval $t_o$. During second interval $t_o$, the execution subunit 33 of the data processing unit can be processing the first instruction #1 21, while the instruction subunit 31 of the central processing system 10 can be processing the second instruction #2 22. During the third interval $t_o$, the cache memory unit 34 can be processing instructin #1 21, the execution unit 33 can be processing instruction #2 22, and the instruction unit 31 can be processing instruction #3 23. This three level pipeline, with concurrent processing in the cache memory subunit 34, the execution subunit 33 and the instruction subunit 31, can continue as long as instructions are entered into the instruction subunit 31 or as long as addresses are provided by a microbranch and sequencer logic unit 405 (shown in FIG. 4b).

It will be clear that the division of the data processing unit into the indicated functional units is, in general, not sufficient to provide an operable pipeline configuration. Each of the functional subunits 31, 32, 33, and 34 described above can require a plurality of subunits to complete each requisite operation to complete the execution of each instruction. With division of the central processing unit 10 into a multiplicity of subunits executing a given microinstruction in a sequential manner, the groups of signals, sometimes referred to as micro-orders, controlling the individual units must be systematically delayed to coordinate the micro-orders with the flow of the signal groups, being processed, through the subunits of the central processing unit 10.

Referring to FIG. 3b, a control unit 32′ for use in delaying the issuance of miro-orders is shown. As seen in FIG. 3b, a macroinstruction is extracted from a unit such as an instruction buffer (not shown) in instruction subunit 31 (refer to FIG. 3a), and applied to a decoder random access memory 50. During time $T_3$, the output of random access memory 50, an address of the first of a set of microinstructions for performing the macroinstruction, is applied to control store 60 through a temporary storage element such as a latch 70 and buffer 80. (It will be understood that in the following description the use of the term "latch" or "buffer" shall not be limiting. Any temporary storage element, such as a flip-flop circuit or trigger circuit may be substituted.) Control store 60 generates the associated set of micro-orders, which are then applied to latch 62.

Latch 62 is divided into three sections to accommodate the three level pipline illustrated in FIG. 2c. Thus, during time period $T_4$, one of its three sets of logic signal groups stored in latch 62 are applied as micro-orders to an associated subunit (S) of the central processing unit, while the remaining two sets are applied to latch 64. During time period $T_5$, one of the remaining sets of micro-orders is applied to an associated subunit (S) of the central processing unit and stores the last set of logic signal groups in latch 68. Then, during time $T_6$, the last set of micro-orders from latch 68 is applied to the associated subunit.

As can be seen, as the complexity of the central processing unit increases, the complexity of the control unit 32′ increases. The microinstructions become increasingly large and unwieldy and, consequently, the numbers and the sizes of latches in control unit 32 (or 32′) increase. A need has therefore been felt for a technique that would provide more manageable microinstruction control and reduce the problems involved in the timely application of the micro-orders to the subunits of the centeral processing unit 10.

SUMMARY OF THE INVENTION

It is therefore an object of the present invention to provide an improved data processing system.

It is yet another object of the present invention to provide an improved microprogrammed data processing system.

It is yet another object of the present invention to provide a central processing unit having a plurality of control stores.

It is a more particular object of the present invention to provide a plurality of control stores in which identical microaddresses can be applied to selected ones of a plurality of control stores.

It is yet another particular object of the present invention to provide a plurality of control stores to which addresses can be applied during different system clock cycles.

The aforementioned and other objects are accomplished, according to the present invention, by a central processing unit operating under microprogram control. The control unit provides the signals that control the apparatus processing the data signal groups. The control unit includes a plurality of control store units for converting address signal groups into microinstruction segments. By utilizing a plurality of control stores, the generation of the microinstruction segments can take place during different clock cycles and can be coordinated in time with the activity of an execution of the individual microinstruction. The plurality of control stores results in a plurality of microinstruction segments, each microinstruction having a narrower field than the microinstruction from a single control store. By generating microinstructions at different times (for a given address), the number of elements used to coordinate a microinstruction with the execution of the segments is reduced.

These and other features of the present invention will be understood upon reading of the following description along with the drawings.

BRIEF DESCRIPTION OF THE DRAWINGS

FIG. 3b is a block diagram of a control unit for use in the central processing unit of FIG. 3a.

DESCRIPTION OF THE PREFERRED EMBODIMENT

1. DETAILED DESCRIPTION OF THE DRAWINGS

Figure 1:
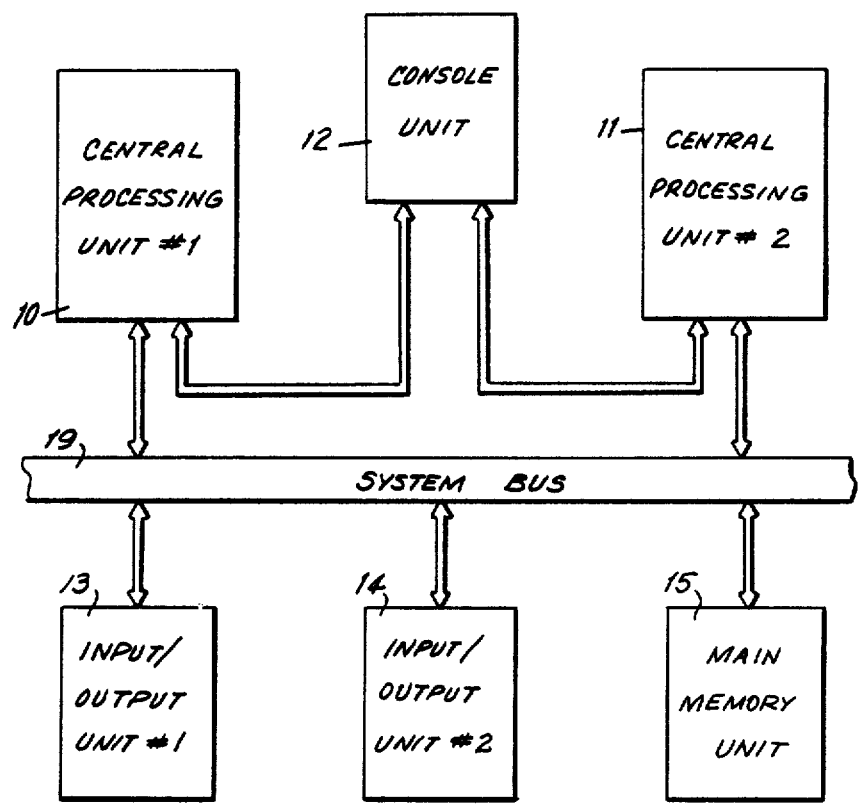
FIG. 1 is a block diagram of a data processing system capable of using the present invention.
Figure 2A:
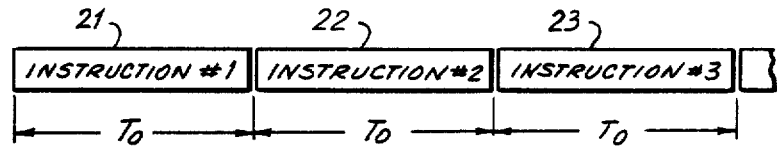
FIG. 2a, FIG. 2b, and FIG. 2c are diagrammatic representations of the division of an instruction into segments.
Figure 2B:
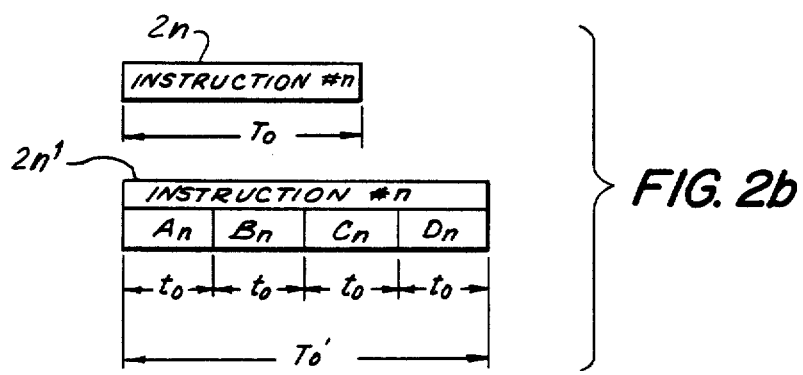
Figure 2C:
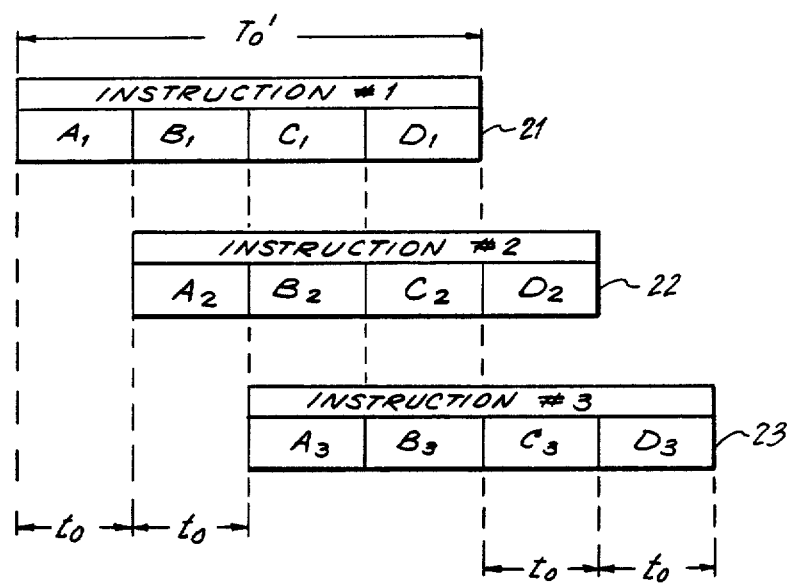
Figure 3A:
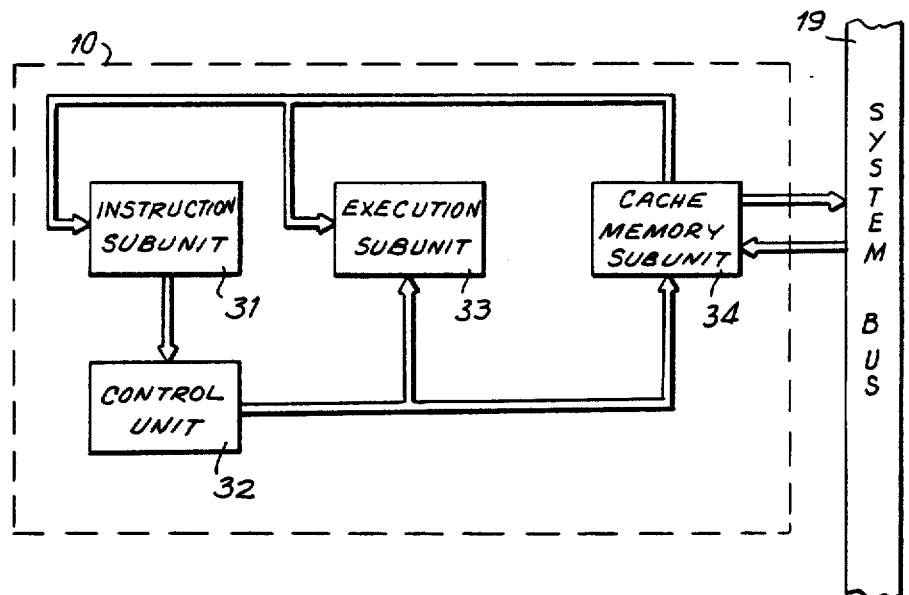
FIG. 3a is a block diagram of a central processing unit with an associated control unit capable of implementing segmented instruction execution.

FIGS. 1, 2 and 3 have been described previously with reference to the related art.

Figure 4A:
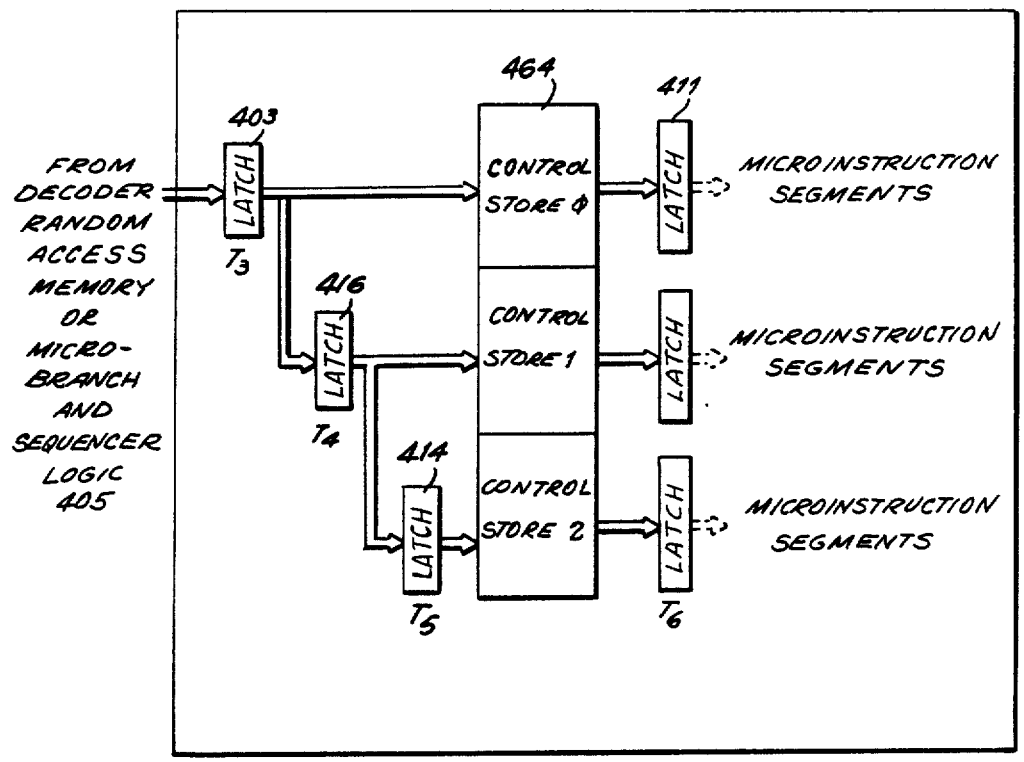
FIG. 4a is a block diagram of a data processing system having a plurality of control units according to the present invention.
Figure 4B:
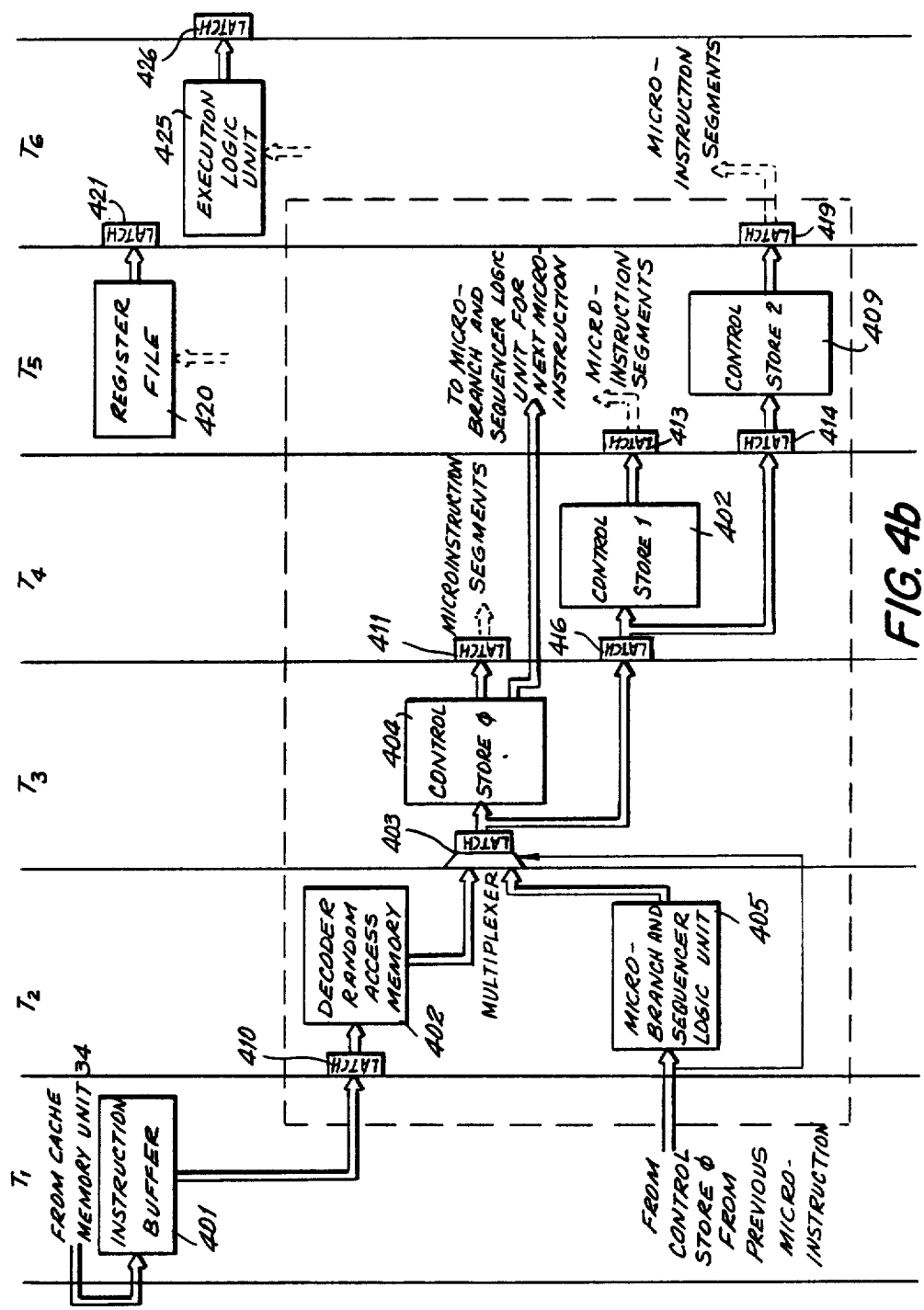
FIG. 4b is a block diagram of the control unit shown in FIG. 4a superimposed on a timing chart.

Referring next to FIG. 4a, a block diagram of a central processing unit 10 having a control unit 32 with a plurality of control stores 464, according to the present invention, is shown. FIG. 4b shows a more detailed diagram of a control unit 32 of the present invention. In FIGS. 4a and 4b, a plurality of time intervals, specifically $T_1$ through $T_6$, are shown. These time intervals generally relate to the flow of control of the central processing unit for execution of a microinstruction, i.e. each time interval relates generally to the execution of a microinstruction segment. Instructions are retrieved from the cache memory subunit 34 and entered in the instruction buffer 401. At the predetermined time, a given (macro)instruction is extracted from the instruction buffer 401 and, during $T_2$, applied through latch 410 to the decoder random access memory 402. The output signals from the decoder random access memory 402 are applied to a first set of terminals of a multiplexer/latch circuit 403. During time period $T_3$ The output signals from the multiplexer/latch circuit 403 are applied to the first control store 404 and simultaneously to latch circuit 416; however, the signals are not entered into latch circuit 416 until time period $T_4$. Output signals of control store 404 are applied directly to micro-branch and sequencer logic unit 405 and to latch circuit 411. During time period $T_4$, the output signals from latch circuit 416 are applied to control store 402 and to latch circuit 414. Output signals of control store 402 are applied directly to latch circuit 413. During the time period $T_5$, the output signals from the latch circuit 414 are applied to a third control store 409, the output signals from third control store 409 being applied directly to latch circuit 419. Thus, it can be seen that the output signals of latch 411, latch 413, and latch 419 are microinstruction segments that can be generated by the same address and on consecutive clock cycles, respectively during intervals $T_4$, $T_5$ and $T_6$.

The execution logic unit 425, along with associated latch circuit 426, and the register file 420, along with associated latch circuit 421, are shown as examples of the essential central processing apparatus that receive micro-orders at differing times and can receive microinstruction segments from different control stores. Latch circuits 410, 403, 411, 413, 414, 416 and 419 along with the latch circuits 421 and 426 are included to emphasize the partitioning of the apparatus and the sequential execution of microinstructions as a function of time.

The microbranch and sequencer logic 405 is included as an example of the apparatus that requires early receipt of signals from the control store 404. The microbranch sequencer 405 is used to implement, among other operations, branching operations and subroutines. A microinstruction segment from control store 404 applied to microbranch sequencer 405 may call into operation one such branching operation or subroutine. A signal from control store 404, applied to multiplexer/latch circuit 403, causes circuit 403 to select the signal from the microbranch and sequencer logic unit 405. It should be emphasized that, as soon as circuit 403 selects signals from microbranch and sequencer logic unit 405, the control unit 32 is redirected to begin a new microinstruction that starts during a time period $T_3$.

2. OPERATION OF THE PREFERRED EMBODIMENT

The execution logic unit 425, the unit generally performing the logic operations on the data signal groups, typically includes several units and can operate in a plurality of modes. A different set of logic signals (micro-orders) will be required for control of each unit operating in the appropriate mode. In addition, the operation of the execution logic unit 425 is typically completed within one clock cycle. Similarly, the efficient operation of the execution logic unit 425 and associated apparatus requires that the data to be manipulated be readily available to the appropriate portion of the execution logic unit 425. In the modern central processing system design, the execution logic unit 425 will typically perform a multiplicity of operations, but only the desired results of the operation are transferred to the appropriate succeeding logic elements. In the preferred embodiment, the data signal groups to be operated upon during a first system clock cycle, the operation on the data signal groups during a succeeding system clock cycle, and the utilization and distribution of the results during a yet later system clock cycle take place in a relatively narrow band of clock cycles. However, these operations can be separated according to principles known in the art.

Thus, the plurality of control stores can be synchronized with the sequential manipulation of data signal groups during microinstruction sequence. It will be clear that the address signals applied to the control stores can be delayed beyond the one clock cycle for each control store if more appropriate microinstruction segment synchronization can be achieved. It will also be clear that, although no saving in the width of a total microinstruction is realized, by partitioning the microinstruction into at least two smaller microinstructions, convenience in implementation can be realized.

Figure 3B:
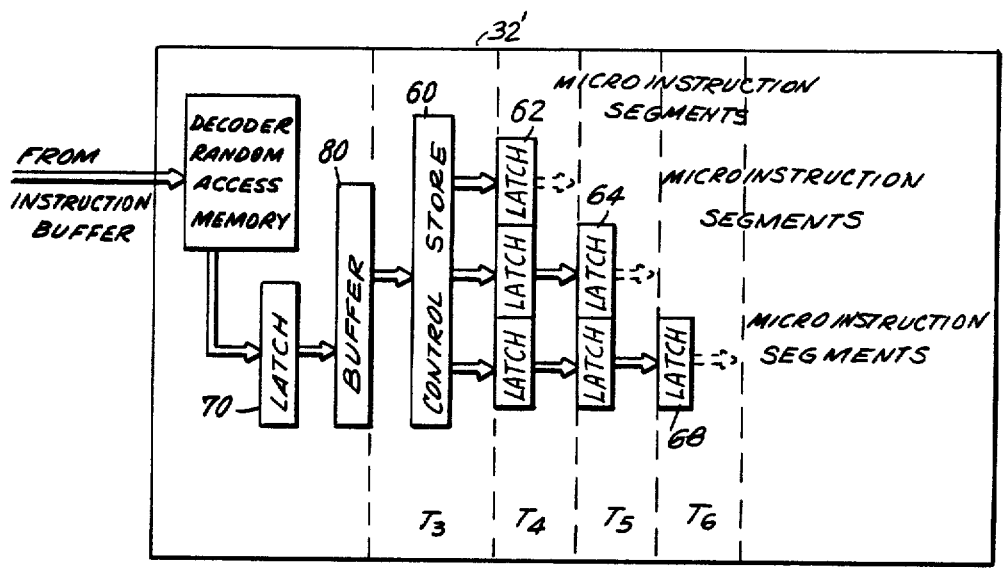

By way of specific example, if an original control store of a central processing unit had a 150 bit field with an approximately 15 bit address field, use of three control stores with approximately 50 bit fields and delay of the address field by one cycle eliminates approximately 100 latch elements at latch 62 in FIG. 3b. Further, this configuration eliminates 50 latch elements at latch 64, and adds only 15 latch elements at latch 414.

It will be also be apparent that the cascading of the latch units 403, 416 and 414 achieve a reduction in the number of elements that must be driven immediately upon application of an address to a control store. This reduction in the signal distribution fanout can be significant. Thus, it can be seen that, as the complexity of the central processing unit increases, resulting in an increase the size of the microinstruction or number of levels in the pipeline, use of the present invention can decrease significantly the complexity of the logic circuit implementation in in the central processing unit's control unit.

The foregoing description is included to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A microprogrammed central processing unit implemented using pipeline techniques and processing data signal groups in response to macroinstructions, said central processing unit comprising:
    a plurality of components for processing data signal groups in response to a macroinstruction, wherein said central processing unit components are divided into pipeline segments, each pipeline segment responsive to a microinstruction segment implementing a portion of said macroinstruction, said macroinstruction being executed when each microinstruction segment of said macroinstruction is applied to a selected pipeline segment in a predetermined time sequence;
    a memory unit for providing a first address signal group in response to said macroinstruction;
    a first control store unit coupled to a first pipeline segment and responsive to said first address signal group provided by said memory unit, said first control store unit applying a first microinstruction segment to said first pipeline segment;
    a second control store unit coupled to a second pipeline segment and responsive to a second address signal group derived from said first address signal group, said second control store unit applying a second microinstruction segment to said second pipeline segment; and
    latch circuit means responsive to said second address signal group for delaying application of said second address signal group to said second control store unit for one system clock cycle, said latch circuit means causing said second microinstruction segment to be applied to said second pipeline segment one system clock cycle after application of said first microinstruction segment to said first pipeline segment.

2. The central processing unit of claim 1 further comprising:
    a third control store unit coupled to a third pipeline segment and responsive to a third address signal group derived from said second address signal group for providing a third microinstruction segment, said third microinstruction segment being applied to said third pipeline segment; and
    second latch circuit means for delaying application of said third address signal group to said third control store unit, said second latch circuit means causing said third microinstruction segment to be applied to said third pipeline segment one system clock cycle after application of said second microinstruction segment to said second pipeline segment.

3. The central processing unit of claim 2 wherein said first, said second and said third group of address signals are equivalent.

4. The method of generating microinstruction segments in response to a macroinstruction for control of a microprogrammed data processing system having a plurality of pipeline segments, said macroinstruction being executed when said microinstruction segments are applied to selected pipeline segments in a predetermined time relationship, the method comprising the steps of:
    generating an address signal group in response to said macroinstruction;
    applying said address signal group to a first control store;
    generating at least a first microinstruction segment by said first control store in response to said address signal group;
    applying said first microinstruction segment to a first pipeline segment;
    applying said at least an address signal group portion to a latch circuit;
    applying said address signal group portion from said latch circuit to a second control store after a one system clock cycle delay;
    generating a second microinstruction segment determined by said address signal group portion by said second control store;
    applying said second microinstruction segment to a second pipeline segment one system clock cycle after application of said first microinstruction to said first pipeline segment;
    applying an address signal group selected portion to a second latch circuit;
    applying said address signal group selected portion from said second latch circuit to a third control store one system clock cycle after application of said address signal group portion to said second control store;
    generating a third microinstruction segment determined by said address signal group selected portion by a third control store; and
    applying said third microinstruction to a third pipeline segment one system clock cycle after application of said second microinstruction to said second pipeline segment.

5. A microprogrammed central processing unit implemented using pipeline techniques and processing data signal groups in response to macroinstructions, said central processing unit comprising:
    a plurality of components for processing data signal groups in response to a macroinstruction, wherein said central processing unit components are divided into pipeline segments, each pipeline segment being responsive to a microinstruction segment implementing a portion of said macroinstruction, said macroinstruction being executed when each microinstruction segment of said macroinstruction is applied to a selected pipeline segment in a predetermined time sequence;

a memory unit for providing a first address signal group in response to said macroinstruction;

a first control store unit coupled to a first of said pipeline segments and responsive to said first address signal group provided by said memory unit, said first control store unit applying a first microinstruction segment to said first pipeline segment;

a second control store unit coupled to a second pipeline segment and responsive to a second address signal group derived from said first address signal group, said second control store unit applying a second microinstruction segment to said second pipeline segment;

a latch circuit coupled to said second control store unit delaying application of said second microinstruction segment to said second pipeline segment, wherein said latch circuit delays application of said second microinstruction segment to said second pipeline segment by one system clock cycle with respect to application of said first microinstruction segment to said first pipeline segment;

a third control store unit coupled to third pipeline segment and responsive to a third address signal group derived from said second address signal group for providing a third microinstruction segment, said third microinstruction segment being applied to said third pipeline segment; and a second latch circuit coupled to said third control store delaying application of said third microinstruction segment to said third pipeline segment, wherein said second latch circuit delays application of said third microinstruction to said third pipeline segment by one system clock cycle with respect to application of said second microinstruction segment to said second pipeline unit.

* * * * *